Sept. 1, 1959 P. L. BRADY ET AL 2,902,296
VALVED COUPLING
Filed April 28, 1958 4 Sheets-Sheet 1

INVENTORS
PAUL L. BRADY
LEE E. BALDWIN
BY
*Walter J. Jason*
ATTORNEY

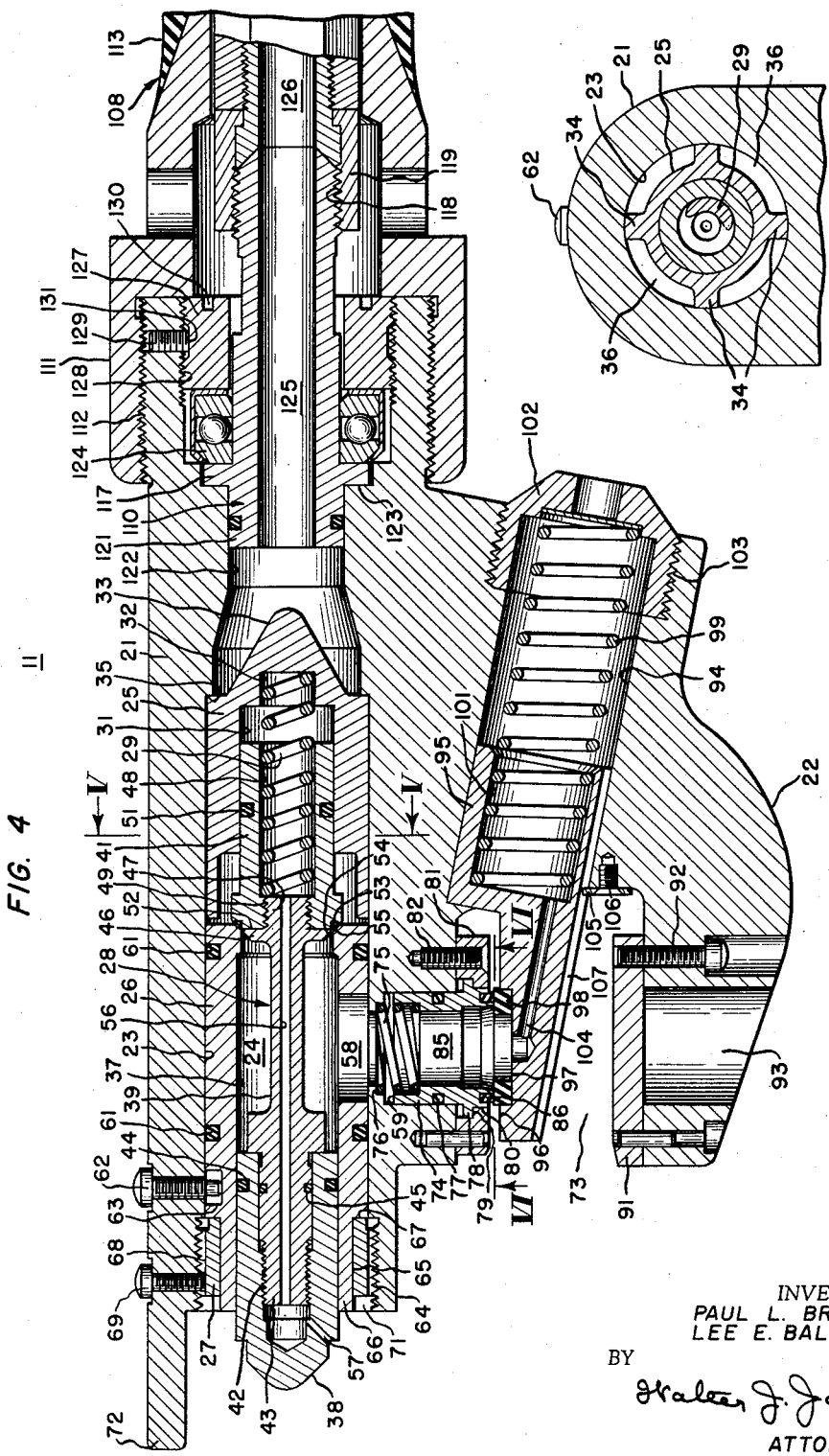

Sept. 1, 1959 P. L. BRADY ET AL 2,902,296
VALVED COUPLING
Filed April 28, 1958 4 Sheets-Sheet 3

INVENTORS
PAUL L. BRADY
LEE E. BALDWIN
BY
*Walter J. Jason*
ATTORNEY

Sept. 1, 1959 P. L. BRADY ET AL 2,902,296
VALVED COUPLING
Filed April 28, 1958 4 Sheets-Sheet 4
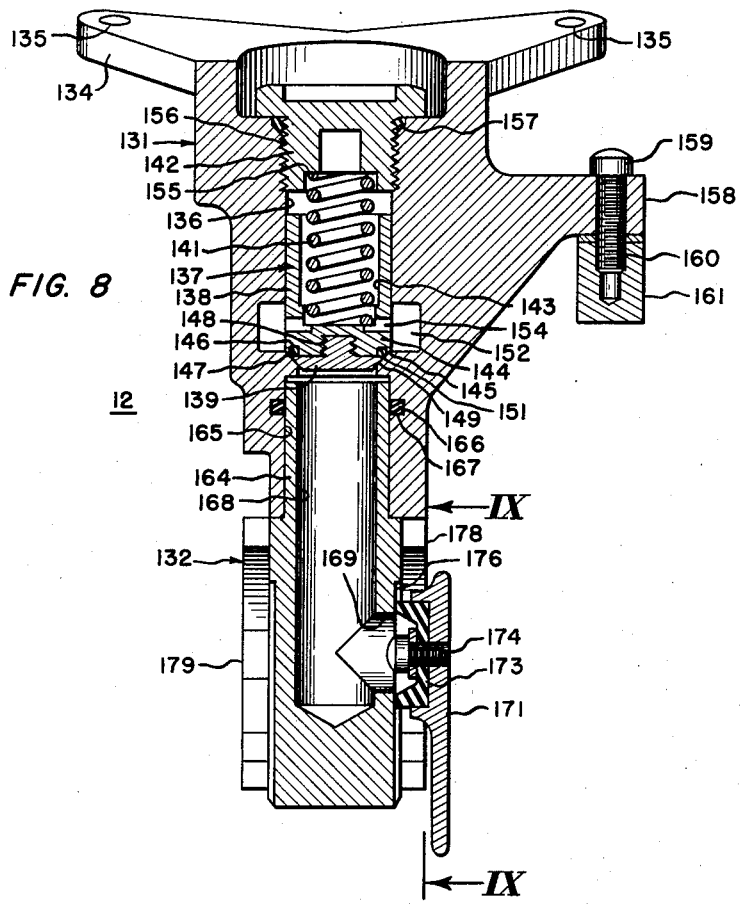
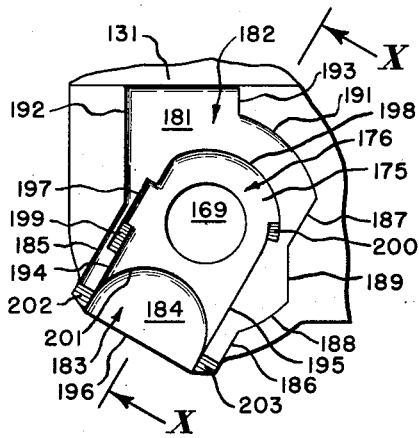
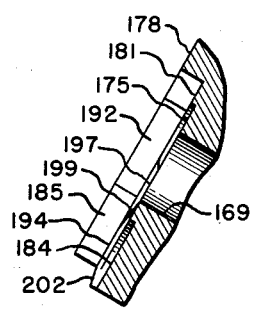
INVENTORS
PAUL L. BRADY
LEE E. BALDWIN
BY
ATTORNEY United States Patent Office 2,902,296
Patented Sept. 1, 1959

2,902,296

VALVED COUPLING

Paul L. Brady, San Diego, and Lee E. Baldwin, Northridge, Calif., assignors to General Dynamics Corporation, San Diego, Calif., a corporation of Delaware Application April 28, 1958, Serial No. 731,523

12 Claims. (Cl. 284—17)

The present invention relates generally to a valved coupling and more particularly to an improved coupling embodying valve means automatically actuated during the action of coupling and uncoupling to provide communication and sealing of the passages of the individual coupling members.

In the process of transferring highly pressurized fluids such as compressed air from one body to another it is customary to employ a system of valves, flexible conduits, and a quick disconnect coupling suitably linked together to transmit and control the flow of fluid. A typical example of such a transfer system may be witnessed in the starting of jet aircraft engines and in replenishing aircraft pressure systems. Usually the source of power is generated by the ground support equipment and conducted to the engine starting mechanism through a flexible hose. Although the aircraft is usually equipped with bottled gas for emergency starting purposes, use of the ground support starting equipment when the craft is stationed at an air base not only conserves the aircraft's bottled gas supply but further saves considerable time and expense required in recharging discharged bottles.

The pressure of the supply air involved in starting a jet engine may be extremely high; i.e., generally approximating 3000 p.s.i. Accordingly the shut-off valves associated with the ground support equipment and the coupling carried by the aircraft must be positive acting to insure against leakage and malfunctioning which might cause the safety of the personnel servicing the craft to be endangered. It is highly desirable that these valves be located within and actuated by, the coupling members themselves in order to preclude the possibility of inadvertent disconnecting of the coupling members prior to cutting off the pressure source.

In certain circumstances for example as during a formation flight when a squadron of planes is required to become airborne within a limited period of time, engine starting must be accomplished with a minimum of delay. Since jet aircraft do not require an engine warm-up period, the craft may be taxied to the runway and be airborne immediately after starting. In order to save time and prevent accidents resulting from failure of the mechanic to disconnect the engine starting ground equipment, the coupling is preferably automatically uncoupled and the pressure cut off by the movement of the craft thereby eliminating the need for the services of the ground crew for such purposes.

Accordingly an object of this invention is to provide a valved coupling for association with a movable body whereby the individual coupling members are caused to be separated by initiating movement of the movable body carrying one of the component coupling members.

Another object of this invention lies in the novel means provided in the above valved coupling for automatically damming the flow of pressurized fluid upon separation of the individual coupling members.

Another object of this invention is to provide a valved coupling capable of being automatically uncoupled while under pressure without jeopardizing the safety of personnel or damaging equipment and vehicles located within range of the free end of a reaction whipped hose.

Another object of this invention is to provide a valved coupling which is readily coupled and uncoupled without the use of tools.

Still another object of this invention lies in the provision of an improved valved coupling characterized by its simplicity of operation in order to effect coupling and whose construction embodies a probe-like coupling element which is directed into engagement with a receptacle type coupling element and thereafter slightly rotated to effect a positive, leak proof connection.

A further object of this invention lies in the novel structure afforded the present valved coupling whereby the port of each of the component coupling members is automatically covered and uncovered concurrently with the disengagement and engagement of the coupling members.

Other objects and features of the present invention will be readily apparent to those skilled in the art from the following specification and appended drawings wherein is illustrated a preferred form of the invention, and in which:

Figure 4 is an enlarged longitudinal sectional view through the probe-like member of the present valved coupling.

Figure 5 is a fragmentary transverse sectional view taken on the line V—V of Figure 4.

Figure 8 is a longitudinal sectional view taken on the line VIII—VIII of Figure 7.

Figure 9 is a fragmentary end view of the port and probe receiving portion of the receptacle coupling member viewed along line IX—IX of Figure 8 with the dust cover removed to clarify the illustration; and Figure 10 is a fragmentary cross-sectional view taken on the line X—X of Figure 9.

Figure 1:
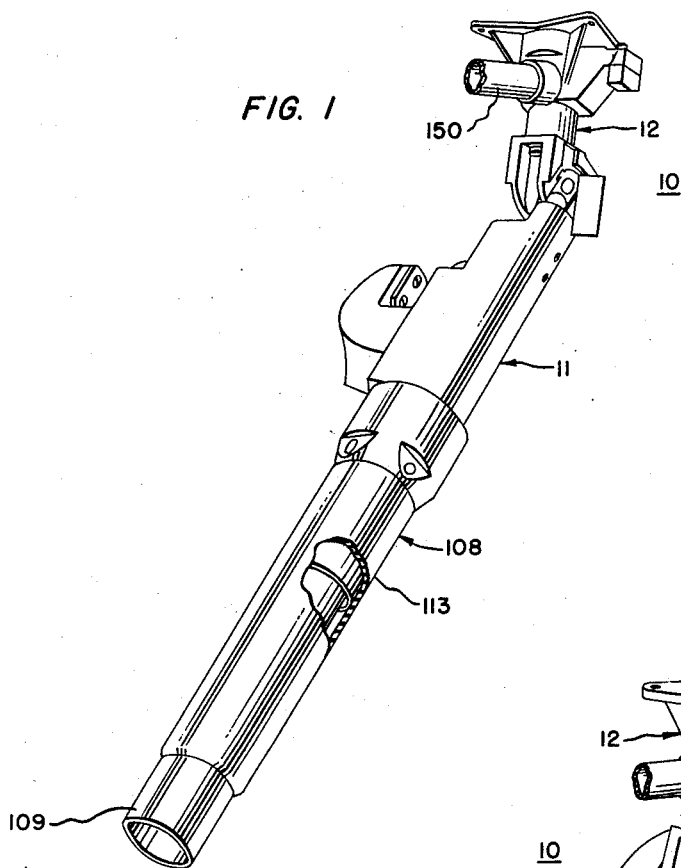
Figure 1 is a perspective view of the valve coupling of the invention showing the probe-like coupling member at the initial stage of engagement with the receptacle type coupling and further showing the dust cover being deflected to uncover the port of the receptacle coupling.

Having reference now with greater particularity to the drawings there is illustrated the present valved coupling which is designated in its entirety generally by the numeral 10. For purposes of illustration it is assumed that coupling 10 is to service the engine of a jet airplane and it is not necessary to the proper understanding of the invention to show either the engine or the airplane. Coupling 10 comprises two principal components, a probe-like coupling member 11 and a receptacle coupling member 12 with receptacle coupling member 12 being suitably secured as by bolts 13 at an appropriate location 14 of the aircraft.

Referring now to Figure 4 the probe coupling element 11 is shown as comprising a body 21 having an integrally formed thumb portion 22 extending therefrom. Body 21 is bored at 23 to receive a valve assembly 24 comprising a socket member 25, a sleeve 26, a retaining nut 27, a valve assembly 28, and a spring 29. Socket member 25 is substantially cylindrical in form having an axially disposed bore 31 in communication with a reduced diameter spring seat 32 located within a conically-shaped end portion 33 thereof. Circumferentially spaced radially extending fins 34 of socket member 25 engage the walls of bore 23 and abut against a shoulder 35 in bore 23 to longitudinally position socket member 25 within bore 23 and provide passages 36 (Figure 5) through which fluid is conducted around socket member 25 as will be more fully described hereinafter. Sleeve 26 is bored at 37 to receive valve assembly 28 comprising an actuating member 38, a valve 39 and a valve guide 41. Actuating member 38 is slideably positioned in bore 37 of sleeve 26 and is internally threaded at 42 to engage mating threads provided at the end of stem portion 43 of valve 39. Sealing is effected between bore 37 and the outer periphery of actuating member 38 by a usual seal ring 44 carried in its associated groove within the body of actuating member 38. Similarly sealing is effected around stem portion 43 of valve 39 by a seal ring 45 positioned in a ring groove in valve 39 for a purpose to be later described.

Valve 39, at its inner end, is provided with an enlarged diameter poppet head 46 merging into a threaded extension 47. Valve guide 41 is bored at 48 having internal threads 49 at one end thereof to engage mating threads of valve extension 47. Valve guide 41 is slidably received in bore 31 of socket member 25 and is suitably sealed with respect thereto by a seal ring 51 positioned in a usual ring groove in the wall of valve guide 41. An end face 52 of valve guide 41 is grooved to receive a seal member 53 which projects slightly beyond the plane of end face 52. Poppet head 46 shoulders against end face 52 and the outer periphery thereof overlies the inner edge of the seal groove to prevent seal member 53 from being inadvertently dislodged therefrom. Valve guide 41 and poppet head 46 are chamfered at 54 providing a coplanar valve face interrupted by the projecting portion of seal member 53. When valve 39 is in its normally closed position as illustrated in Figure 4 of the drawings, chamfer 54 engages a seat 55 in sleeve 26 whereby seal member 53 is compressed firmly against seat 55. Spring 29 positioned in bore 48 of valve guide 41 urges seal 53 into contact with seat 55 by reason of its compression between spring seat 32 of socket member 25 and threaded extension 47 of valve 39. As valve 39 is unseated causing valve guide 41 to move into bore 31 of socket member 25, displaced air is vented through an axial passage 56 in valve 39 and a passage 57 in actuating member 38 communicating with atmosphere.

A port 58 is provided in the wall of sleeve 26 to communicate with bore 37 of sleeve 26 and is located intermediate actuating member 38 and poppet head 46 of valve 39 to align with a transverse passage 59 communicating with bore 23 in probe body 21. A pair of seal rings 61 positioned in usual ring grooves in sleeve 26 straddle port 58 to effect sealing between bore 23 of probe 11 and sleeve 26 on either side of port 58. Rotation of sleeve 26 within bore 23 is effectively prevented by a screw 62 which is screw threaded through the wall of probe 11 and extends its inner end into an elongated recess 63 in the wall of sleeve 26. Port 58 of sleeve 26 is maintained in registry with transverse passage 59 by retaining nut 27. Nut 27 is screw threadedly engaged with threads 64 of bore 23 of probe body 21 and is bored at 65 to slidably fit over a reduced diameter end portion 66 of sleeve 26 to abut against a shoulder 67 of sleeve 26. The external threads of nut 27 are interrupted by a plurality of circumferentially spaced parallel grooves 68. A locking screw 69 is provided which passes through an internally threaded transverse opening in body 21 to extend into one of the parallel grooves 68 to lock nut 27 against inadvertent turning after adjustment has been made. Nut 27 is provided with spanner wrench lugs 71 to receive the mating prongs of a usual spanner wrench to effect proper adjustment thereof in order to align port 58 of sleeve 26 with transverse passage 59.

Probe body 21 in the region adjacent actuating member 38 is extended at 72 to afford protection against damage to actuating member 38 and inadvertent unseating of valve assembly 28 when probe 11 is automatically disconnected from its mating receptacle during take-off as will be further explained. Additionally extension 72 of probe 11 serves to deflect the dust cover of the vehicle carried receptacle 12 upon being engaged therewith as will become apparent in the description of the operation hereinafter set forth.

Figure 6:
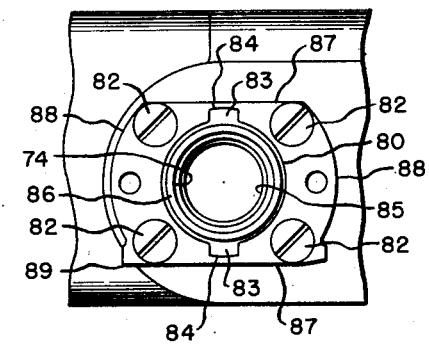
Figure 6 is a fragmentary end view of the seal and locking plate assembly viewed in the direction of the arrows VI—VI of Figure 4.
Figure 7:
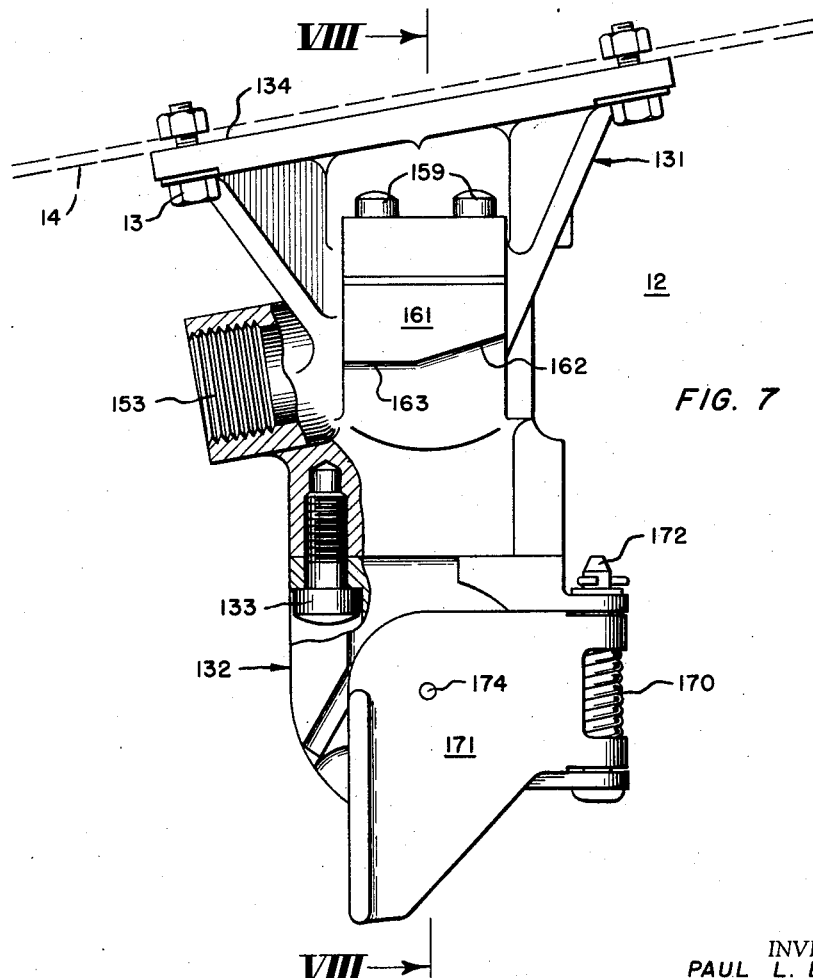
Figure 7 is an enlarged elevational view of the receptacle coupling member with a portion broken away to facilitate the illustration.

Passage 59 of body 21 opens into a spacing area 73 extending between body portion 21 and thumb portion 22 of probe 11. Slidably positioned within passage 59 is a retainer element 74 biased in an outward direction by a compression spring 75 bearing between retainer 74 and an integral shoulder 76 of passage 59. Retainer 74 is pressure sealed with respect to passage 59 by a usual seal ring 77 positioned within a groove therein. A portion of retainer 74 projects outwardly of passage 59 and is provided with an external flange 78 which slidably fits in a recess 79 in a guide plate 81 to permit restricted slideable movement of retainer 74 within passage 59. Guide plate 81 is centrally apertured as at 80 and is secured to body portion 21 of probe 11 as by screws 82 with its aperture 80 in alignment with passage 59 to permit extension of the lower end of retainer 74 therethrough. As shown in Figure 6 of the drawings, lugs 83 projecting from retainer 74 slideably mate with notches 84 in guide plate 81 to prevent rotation of retainer 74 within passage 59. Retainer 74 is axially bored at 85 to provide communication with passage 59. The lower face of the portion of retainer 74 which is adapted to extend through aperture 80 is grooved to receive a seal ring 86 suitably retained therein as by spinning or crimping of the groove edges against seal 86. Guide plate 81 is substantially rectangular in outline having a pair of straight, parallel edges 87 interconnected by a pair of arcuate edges 88. At least one of the arcuate edges 88 adjacent an edge 87 is squared at 89 to facilitate engagement of probe 11 with the vehicle carried receptacle 12 as will be further explained hereinafter.

A guide plate 91 shaped similarly to guide plate 81 is secured to thumb portion 22 by screws 92 to lie in opposition to guide plate 81. Guide plate 91 differs from guide plate 81 in that it is not apertured but is smooth-faced. Thumb portion 22 is bored at 93 as a manufacturing expedient to permit boring of passage 59 otherwise serving no particular function.

Provided in the material at the interconnection of body 21 and thumb portion 22 is an angularly disposed bore 94 which opens to the space 73 which separates body 21 and thumb portion 22. Bore 94 is adapted to slidably contain an annular in cross-section dust cover 95. Cover 95 is cut out as at 96 adjacent and parallel to guide plate 81 and is recessed at 97 within cut out 96 to receive a seal ring 98 suitably cemented therein. Seal ring 98 is normally held in engagement with seal ring 86 of retainer 74 by the bias of a compression spring 99 seated at one end within a bore 101 in dust cover 95 and resting its opposite end against a plug 102. Plug 102 screw threads at 103 into thumb portion 22 to close one end of bore 94. Dust cover 95 is provided with a passage 104 communicating with seal containing recess 97 at one end and with spring containing bore 101 at its opposite end. Rotation of cover 95 within bore 94 is effectively prevented by a plate 105 secured to thumb portion 22 by a screw 106 and extending into a longitudinal groove 107 provided in cover 95. It will be noted that the tongue-in-groove arrangement of plate 105 with respect to groove 107 is loosely fitted to permit venting of air leaking around valve assembly 28 into bore 37 and passage 59 to atmosphere through passage 104, bore 94 and around plate 105 through groove 107.

Figure 2:
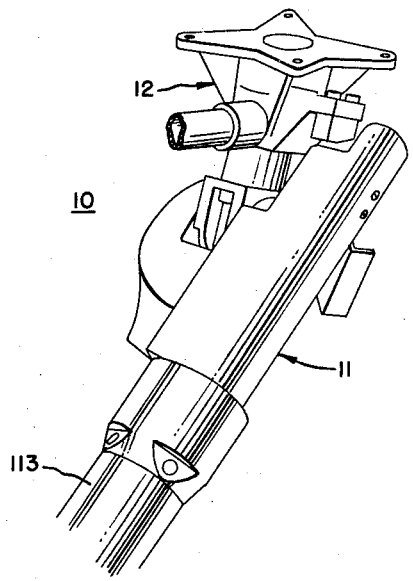
Figure 2 is a perspective view similar to Figure 1 showing the coupling members completely engaged with one another prior to rotation of the probe-like coupling member.
Figure 3:
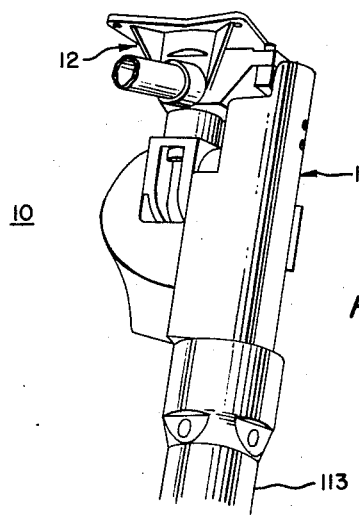
Figure 3 is another perspective view similar to Figures 1 and 2 showing the coupling members engaged and the probe-like member rotated into operative position to effect opening of the valve whereby the passages of the probe and receptacle members are in communication with one another.

Attachment of probe 11 to the suitable pressure source (not shown) is achieved through a flexible hose assembly generally designated 108 whch includes a hose 109. The connection of hose 109 (Figures 1, 2, and 3) to probe 11 preferably involves the use of a swivel type device 110. Restraining means to prevent sharp bends in the hose 109 in the area thereof adjacent the swivel 110 is desirable in order to permit proper functioning of the swivel 110 without undue binding. Such a restraining means for the hose 109 is illustrated in Figure 4 and includes a rigid connector fitting 111 which is internally threaded at 112 to engage mating threads of body portion 21 of probe 11. Connector 111 externally surrounds hose 109 extending therealong a substantial distance beyond its threaded connection with probe 11. A resilient sleeve 113 vulcanized or otherwise secured to connector 111 overlies the extended end thereof and engages hose 109 at a point spaced relative to the extended end of connector 111 as illustrated in Figure 1 of the drawings.

Swivel 110 is cylindrical in cross section having a radially extending collar 117 positioned intermediate the ends thereof. One end of swivel 110 is externally threaded at 118 and engages the internal threads of a hose fitting 119 to effect connection with hose 109. The opposite end 121 is rotatably and sealably received in a bore 122 of body 21, collar 117 being interposed between a shoulder 123 in body 21 and a thrust bearing 124. Bore 122 forms an extension of bore 23 of body 21 and swivel 110 is axially bored at 125 to communicate with bore 23 and with a through bore 126 of hose fitting 119 to provide an unobstructed pressure passage from hose 109 to bore 23 of body 21.

Bearing 124 is suitably retained within an enlarged portion of bore 122 of body 21 by a nut 127 having external threads 128 engaging mating internal threads of bore 122. A set screw 129 threadedly passing through body 21 serves to lock nut 127 against turning after adjustment has been made by being forcibly engaged with a smooth annular area 131 which interrupts threads 128 of nut 127. Holes 130 are provided in the end face of nut 127 to receive the lugs of a usual spanner wrench used for turning nut 127 to properly position bearing 124 against collar 117 of swivel 110.

Figures 7, 8, 9, and 10 relate to the receptacle member 12 of the present invention which will now be described.

Receptacle member 12 comprises as its major elements a body 131 and a disconnect fitting 132 which is secured to body 131 by screws 133. Body 131 is provided with a mounting flange 134 having holes 135 therein whereby receptacle member 12 may be fixedly supported at an appropriate location on the aircraft (not shown) and in a suitable manner such as by bolting. Slidably positioned within a bore 136 of body 131 is a valve assembly 137 comprising a valve member 138, a compression spring 141, and a retaining nut 142. Valve member 138 is cylindrical in cross section having an axial bore 143 and a closed end 144 externally chamfered at 145 and is provided with an annular groove 146 in which a suitable sealing ring 147 is positioned. Cap 139 is screw threadedly secured to valve member 138 at 148 and is provided with a chamfered face 149 coplaner with chamfer 145 of valve member 138. The outer periphery of cap 139 overlies a portion of groove 146 in valve member 138 to prevent accidental dislodgement of sealing ring 147 from groove 146. Chamfered faces 145 and 149 together with sealing ring 147 rest against an annular seat 151 within bore 136. A chamber 152 intersects bore 136 adjacent seat 151 and communicates with a discharge port 153 (Figure 7) adapted to be connected to a suitable conduit 150 which connects with the airplane jet engine starting system. Communication between chamber 152 and bore 143 of valve member 138 is effected through a plurality of orifices 154 located in the wall of valve member 138. Valve member 138 is normally urged into engagement with seat 151 by the bias of spring 141 facing against closed end 144 at its one end and against a shoulder 155 in nut 142 at its opposite end. Nut 142 is screw threadedly engaged with internal threads of bore 136 at 156 and is sealed with respect thereto by a usual sealing member 157. Integrally formed with body 131 and spaced from flange 134 thereof is a support flange 158 having screw openings therethrough adapted to receive screws 159 which engage with internal threads in a recess 160 of a stationary striker block 161 which includes an inclined camming surface 162 and a dwell surface 163 the purpose of which will be later explained.

Referring now to the disconnect fitting 132 as shown in Figure 8 it is seen that fitting 132 includes a cylindrical extension 164 which projects into a bore 165 of body 131. Bore 165, as shown, is in axial extension with bore 136 being interrupted by the valve seat 151. Extension 164 is sealed with respect to bore 165 by a usual sealing ring 166 positioned in an annular groove 167 in body 131. Disconnect fitting 132 is provided with an axial passage 168 communicating with a laterally disposed port 169 at one end and extending therefrom in the direction of bore 136 of body 131 for communication with valve assembly 137.

A generally plate-like dust cover 171 is hingedly secured to disconnect fitting 132 by a pin 172. A sealing washer 173 suitably secured to dust cover 171 by a bolt 174 surrounds port 169 and is normally held in contact with the base surface 175 of a recess or slot 176 by the action of a torsion spring 170 carried by pin 172.

Disconnect fitting 132 is provided with external planar faces 178 and 179 on opposite sides thereof. Dust cover 171 is associated with planar face 178 and this latter planar face will now be described.

As best shown in Figures 9 and 10 the planar face 178 is formed with a multiplicity of recesses or slots of which the above mentioned recess or slot 176 is one. Recess 176 is cut into base surface 181 of a guide-plate receiving recess or slot 182 and base surface 175 of recess 176 lies in a plane parallel to the plane of base surface 181 of recess 182, and both of these base surfaces lie parallel to the plane of external face 178. Formed in the base surface 175 of recess 176 is a third recess or slot 183 having a base surface 184 which lies parallel to base surface 175. The purposes of these recesses or slots 176, 182 and 183 will be later described.

The uppermost or guide-plate receiving recess 182 is, as best shown in Figure 9, of irregular wall outline. This wall outline includes a pair of opposed and parallel inclined wall portions 185 and 186 adjacent the entrance to the slot, the inclination of these portions 185 and 186 is understood to be to the vertical axis of the receptacle when mounted in operative position on the aircraft.

Spaced from wall portion 186, and in the same plane therewith, is an inclined wall portion 187 which also is parallel to wall portion 185. Wall portion 186 is spaced or separated from wall portion 187 by an arcuate wall portion 188 and a planar wall portion 189. At the opposite end of wall portion 187 is an arcuate abutment wall portion 191. A pair of parallel, straight wall portions 192 and 193 extend respectfully from inclined wall portion 185 and abutment wall portion 191 to terminate at an opening which is adapted to be closed by the rear wall of body 131 when body 131 and disconnect fitting 132 are secured together. It is noted that the arcs of arcuate walls 188 and 191 generate about the center of port 169.

The intermediate recess or slot 176 is also of irregular outline having a pair of spaced parallel wall portions 194 and 195 (extending from the entrance to the recess at end wall 196 of disconnect fitting 132), an offset wall portion 197 and an arcuate end wall 198. Wall portions 194, 195 and 197 lie parallel to wall portions 185 and 186 of recess 182. Base surface 175 of recess 176, for a purpose to be described, merges with the base surface 181 of recess 182 thereabove through a pair of inclined ramps 199 and 200.

The third recess or slot 183 is located adjacent the entrances to recesses 176 and 182 and includes an arcuate transition wall 201.

At the opposite sides of recess 183 and in the entrance to the recess 182 are two inclined ramps 202 and 203 which lead to base surface 181 of recess 182 and provide ready access means to such surface 181 during the engagement of probe 11 with receptacle 12 as will be fully described hereinafter.

The three recesses or slots 176, 182 and 183 are as described above formed in planar face 178 of disconnect fitting 132. The opposite planar face 179 is also slotted including slots 176 and 182 (not shown) substantially similar to slots 176 and 182 of face 178 but omitting the third slot 183. Further there is no port opening similar to port 169.

The operation of the present coupling will now be described.

To effect coupling of probe 11 with receptacle 12, probe 11 is brought towards receptacle 12 in an attitude as illustrated in Figure 1 where it will be observed that extension 72 thereof first engages a projecting or lipped edge of dust cover 171 thereby pivoting cover 171 about the axis of its hinge pin 172 to uncover port 169 of disconnect fitting 132. Subsequently probe 11 is manually advanced towards receptacle 12 in an attitude approximating the angle of spaced parallel walls 185, 186 of disconnect fitting 132 until such time as guide plates 81, 91 of the probe 11 approach inclined ramps 202 and 203 at the entrance to slots 182 of disconnect fitting 132. As hereinbefore described, one corner 89 adjacent parallel edge 87 of the guide plates 81, 91 is squared for reasons as will now be described. Since edges 87 of guide plates 81, 91 are parallel with one another and the distance across the parallel faces closely approximates the distance across the parallel walls 185 and 186 of slots 182 of disconnect fitting 132, it will be apparent that in order to effect mating of guide plates 81, 91 within the track defined by walls 185 and 186 of slot 182, precise alignment would be necessary. In other words the ground crew personnel handling the coupling operation of probe 11 with receptacle 12 would have to move probe 11 back and forth until the parallel edges 87 of the guide plates 81, 91 fell in line with the parallel walls 185 and 186. Squaring one corner 89 of guide plates 81, 91 places it slightly in advance of the opposite corner in which case corner 89 is first engaged with wall 185 whereupon probe 11 may then be pivoted about this engagement until proper alignment is effected to permit guide plates 81, 91 to be slidably engaged within the tracks formed by walls 185 and 186 of the slots 182.

Concurrently with the engagement of guide plates 81, 91 with walls 185, 186 of their slots 182 dust cover 95 of probe 11 strikes against the exterior end surface 196 of disconnect fitting 132 forcing the dust cover 95 to recede into bore 94 against the bias of spring 99 to thereby initiate uncovering of passage 59 of probe body 21 to expose retainer 74 and seal ring 86 therewithin. As probe 11 continues to advance into the position illustrated in Figure 2, seal ring 86 carried by retainer 74 enters slot 183. In this position sealing ring 86 is sufficiently spaced from surface 184 of slot 183 to prevent damage or dislodgement of sealing ring 86 during the engagement operation. Further movement of probe 11 into engagement with disconnect fitting 132 causes lugs 83 of retainer 74 to engage inclined ramps 202 and 203 and slide along surface 181 of slot 182 in planar surface 178 until such time as arcuate edge 88 of the guide plates 81, 91 strikes against arcuate abutment wall 191 at which time one of the lugs 83 projecting through guide plate 81 will rest upon base surface 175 of slot 176 of planar surface 178 in the area of offset wall 197 after having descended from surface 181 by means of inclined ramp 199. It will be noted that seal ring 86 of retainer 74 is held spaced from surface 175 of slot 176 during the sliding movement of lugs 83 on surface 181 to preclude possible damage to or scuffing of sealing ring 86. Following full linear engagement of probe 11 with disconnect fitting 132, probe 11 is then rotated in counterclockwise direction as viewed in Figure 9. During rotation the lug 83 remaining on surface 181 begins descending inclined ramp 200 simultaneously with the opening of valve assembly 28 which is carried by probe body 21. After the initiation of this rotative movement actuating member 38 of valve assembly 28 becomes partially depressed as a result of its engagement with camming surface 162 of striker block 161 thereby partially unseating valve 39 in probe body 21 from its seat 55 and against the bias of spring 29. If desired, purging of the hose 109 and associated ground equipment may be accomplished in the interval before lug 83 leaves ramp 200 and before seal ring 86 of retainer 74 becomes completely engaged with surface 175 of disconnect fitting 132 simply by stopping any further rotative movement and holding hose 109 in a partially rotated attitude.

Probe 11 is locked to disconnect fitting 132 immediately upon the occurrence of the rotative movement since arcuate edge 88 of guide plates 81, 91 will engage with arcuate wall 188 of slots 182. As rotation is continued, lug 83 descends ramp 200 to engage surface 175 of slot 176 of planar surface 178 whereupon sealing ring 86 of retainer 74 will be firmly seated against surface 175 to effect positive sealing around port 169. During this rotative movement actuating member 38 slides onto dwell surface 163 off of inclined camming surface 162 thereby further unseating valve 39 from its seat 55 to effect full opening of valve assembly 28. Rotation of probe 11 with respect to disconnect fitting 132 is finally arrested upon engagement of a parallel edge 87 of guide plates 81, 91 with wall 192 of slots 182. During opening or unseating of valve 39 air trapped in bore 48 of valve guide 41 and bore 31 of socket member 25 in probe body 21 is vented to atmosphere through passage 56 in valve 39 which is in communication with passage 57 in actuator member 38.

In the fully opened position of valve 39, pressurized air conducted through hose 109 passes through bore 126 of hose fitting 119 and bore 125 of swivel 110 into bores 122 and 23 of probe body 21, then between fins 34 of socket member 25 into bore 37 of sleeve 36 and then outwardly through port 58 of sleeve 36 and into passage 59, then through bore 85 of retainer 74, into port 169 of disconnect fitting 132, thereafter into passage 168 of disconnect fitting 132 forcing valve member 138 of receptacle body 131 to unseat against the bias of spring 141; thereupon the air flows into chamber 152 and discharges through port 153 into conductor 150 which is in connection with the aircraft engine starting system.

After engine starting has been accomplished and while probe 11 is still engaged with receptacle 12, the present invention is adapted to be automatically uncoupled by movement of the aircraft relative to the ground located source of pressurized air to which hose 109 is attached. Receptable 12, it is understood, is located on the aircraft above the plane of the pressurized air source. As slack in hose 109 is taken up by the action of the aircraft moving away from the stationary ground located air equipment, the angular disposition of hose 109 with respect to receptacle 12 changes whereby probe 11 rotates relative to receptacle 12 until such time as the parallel edges 87 of guide plates 81, 91 align with parallel walls 185, 186 and 187 of slots 182 of disconnect fitting 132 to bring arcuate edge 88 of guide plates 81 and 91 out of engagement with the arcuate wall 188 of slots 182. Plates 81 and 91 are now free to slide outwardly from their associated slots 182. Prior to plate 81 returning to its release position there will occur a progressive movement of valve 39 of probe 11 toward its seat 55 and an automatic venting of sleeve 26 and passage 59 will occur. This automatic venting is effected by the movement of a lug 83 of retainer 74 upon inclined ramp 200 which lifts sealing ring 86 of retainer 74 out of contact with surface 175. Valve 39 moves progressively to its closed position as actuating member 38 of valve assembly 28 slides down inclined camming surface 162 of striker block 161. It is apparent that when probe 11 is rotated to its release position and before linear separation of probe 11 from receptacle 12 has taken place, actuating member 38 of valve assembly 28 in probe 11 will be completely disengaged from striker block 161 to permit and assure the reseating of valve 39 onto its seat 55. With valve 39 seated, air flow to receptacle 12 is shut off and valve 138 of receptacle 12 therefore also returns to its normal closed position.

Thus with valves 39 and 138 in their closed position the withdrawal of plates 81 and 91 of the probe 11 from their associated slots on receptacle 12 on the movement of the airplane will be accomplished safely and without danger of whipping of the hose as to possibly injure personnel who might be in the vicinity.

As stated above, planar face 179 of receptacle 11 is slotted and ramped substantially similarly to planar face 178. The purpose of providing this slotting and ramping is to care for situations where personnel might inadvertantly try to connect probe 12 in an upside-down position to receptacle 11, thereby subjecting the sealing ring 86 of probe 12 to possible injury. The use of the slots and ramps will serve to hold sealing ring 86 spaced from contact with receptacle 11 thereby preventing rubbing and possible injury thereto.

Manual disconnecting of probe 11 obviously may be effected if desired. Since the operation of probe 11 manually is exactly the same as occurs on movement of an airplane there will be an automatic venting of sleeve 26 and passage 59 and a closing of the valves 39 and 138. Since there will be no airflow there will be no danger of whipping of the hose or danger of sudden blasting of high pressure air outwardly and, therefore, ground personnel will not be subject to hazard.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A valved coupling comprising a first fluid conducting member having a fluid conductor connected thereto, a second fluid conducting member, normally closed movable valve means in each of said fluid conducting members controlling the passage of fluid therethrough, said first and second fluid conducting members each having fluid ports adapted to be placed in communication, guide means on one of said fluid conducting members receivable within slot means in the other fluid conducting member and movable within said slot means for engagement with the walls thereof for releasably connecting said fluid conducting members one to the other, sealing cover means movably carried by each of said fluid conducting members normally to close the fluid ports thereof, surface portions on each said fluid conducting members engageable, on connection of said fluid conducting members, with the sealing cover means of the other fluid conducting member for movement thereof to open said fluid ports for communication therebetween, and actuating means operative upon connection of said fluid conducting members to effect movement to open positions of said movable valve means in said fluid conducting members.

2. A valved coupling comprising a first fluid conducting member having a fluid conductor connected thereto, a second fluid conducting member, normally closed movable valve means in each of said fluid conducting members controlling the passage of fluid therethrough, said first and second fluid conducting members each having fluid ports adapted to be placed in communication upon connection of said fluid conducting members one to the other, guide means on one of said fluid conducting members receivable within slot means in the other fluid conducting member and movable within said slot means for engagement with the walls thereof for releasably connecting said fluid conducting members one to the other, movable actuating means operative upon the valve means of said first fluid conducting member, and means on said second fluid conducting member engageable by said actuating means on connection of said fluid conducting members for movement of said actuating means to move its associated valve means to open position to pass fluid through said fluid ports to actuate said valve means of said second fluid conducting member to its open position.

3. A valved coupling comprising a first fluid conducting member having a fluid conductor connected thereto, a second fluid conducting member, normally closed movable valve means in each of said fluid conducting members controlling the passage of fluid therethrough, said first and second fluid conducting members each having fluid ports adapted to be placed in communication upon connection of said fluid conducting members one to the other, guide means on one of said fluid conducting members receivable within slot means in the other fluid conducting member and movable within said slot means for engagement with the walls thereof for releasably connecting said fluid conducting members one to the other, movable actuating means operative upon the valve means of said first fluid conducting member, means on said second fluid conducting member engageable by said actuating means on connection of said fluid conducting members for movement of said actuating means to move its associated valve means to open position, sealing cover means movably carried by each of said fluid conducting members normally to close the fluid ports thereof, and surface portions on each of said fluid conducting members engageable, on connection of said fluid conducting members, with the sealing cover means of the other fluid conducting member for movement thereof to open said fluid ports for communication therebetween, said valve means of said second fluid conducting member being fluid pressure actuated to its open position upon passage of fluid through said communicating fluid ports.

4. A valved coupling comprising a first coupling member, a second coupling member adapted to be readily releasably connected to said first coupling member, each of said coupling members having first fluid passages therein, valve members positioned in said passages of said first and second coupling members to regulate the flow through said passages, spring means biasing said valve members to normally closed positions, said coupling members each having second fluid passages therein adapted to be aligned with one another upon connection of said first and second coupling members to provide communication between said first fluid passages, actuator means on said first coupling member operative upon the valve member thereof, and cam surfaces on said second coupling member engageable by said actuator means on connection of said coupling members for movement of said actuator means to move its valve member to open position for passage of fluid through said second fluid passages to the first passage of said second coupling member for fluid pressure actuation of the valve member therein to open position.

5. A valved coupling comprising a first fluid conducting member having a fluid conductor connected thereto, said first fluid conducting member having a fluid passage, a normally closed movable valve means in said fluid passage controlling flow of fluid therethrough, a second fluid conducting member having a fluid passage, a pressure actuated normally closed movable valve means therein for controlling the passage of fluid therethrough, said first and second fluid conducting members each having fluid ports adapted to be placed in aligning communication to connect the fluid passages thereof, guide means on said first fluid conducting member, said second fluid conducting member having slot means for receiving said guide means, said guide means being movable within said slot means for engagement with the walls thereof for releasably connecting said fluid conducting members one to the other, said guide means having a transverse opening in alignment with the fluid port of said first fluid conducting member, movable means having a fluid passage therethrough positioned in said latter fluid port and carrying an annular sealing means adapted to be placed in sealing relationship about the fluid port of said second fluid conducting member on the connection of the said fluid conducting members one to the other, an actuating member operative upon said valve means of said first fluid conducting member, and means on said second fluid conducting member engageable by said actuating member on connection of said fluid conducting members for movement of said actuating member to move its associated valve means to open position, said valve means of said second fluid conducting member thereafter being fluid pressure actuated to its open position.

6. A valved coupling comprising a first fluid conducting member having a fluid conductor connected thereto, said first fluid conducting member having a fluid passage, a movable valve means in said fluid passage controlling flow of fluid therethrough, a second fluid conducting member having a fluid passage, a pressure actuated movable valve means therein for controlling the passage of fluid therethrough, spring means normally biasing each of said valve means to its closed position, said first and second fluid conducting members each having fluid ports adapted to be placed in aligning communication upon connection of said fluid conducting members one to the other to connect the fluid passages thereof, guide means on said first fluid conducting member, said second fluid conducting member having slot means for receiving said guide means, said guide means being movable within said slot means for engagement with the walls thereof for releasably connecting said fluid conducting members one to the other, said guide means having a transverse opening in alignment with the fluid port of said first fluid conducting member, movable means having a fluid passage therethrough positioned in said latter fluid port and carrying an annular sealing means adapted to be placed in sealing relationship about the fluid port of said second fluid conducting member on the connection of the said fluid conducting members one to the other, actuator means on said first fluid conducting member operative upon with the valve means thereof, and surface portions on said second fluid conducting member engageable by said actuator means on connection of said fluid conducting members for movement of said actuator means to move its valve means to open position for passage of fluid from the fluid passage of said first fluid conducting member through said fluid ports to the fluid passage of said second fluid conducting member for fluid pressure actuation of the valve means therein to open position.

7. A valved coupling comprising a first fluid conducting member having a fluid conductor connected thereto, said first fluid conducting member having a fluid passage, a normally closed movable valve means in said fluid passage for controlling flow of fluid therethrough, a second fluid conducting member having a fluid passage, a normally closed movable valve means therein for controlling the passage of fluid therethrough, said first and second fluid conducting members each having fluid ports adapted to be placed in aligning communication to connect the fluid passages thereof, guide means on said first fluid conducting member, said second fluid conducting member having a slotted area for receiving said guide means, said slotted area including wall portions slidably engageable by surfaces of said guide means for effecting rectilinear and rotative covement of guide means within said slotted area into holding engagement with the slotted area for releasably connecting said fluid conducting members one to the other, said guide means having an opening in alignment with the fluid port of said first fluid conducting member, rectilinearly movable retainer means having a fluid passage therethrough slidably positioned in said latter fluid port and carrying an annular sealing means adapted to be placed in sealing relationship about the fluid port of said second fluid conducting member on the connection of the said fluid conducting members one to the other, said slotted area having a plurality of surfaces spaced in elevation from one another, projecting means on said retainer means rideable on said surfaces effecting progressive movement of said annular sealing means to its sealing position about said fluid port of said second fluid conducting member, an actuating member operative upon said valve means of said first fluid conducting member, and means on said second fluid conducting member engageable by said actuating member on connection of said fluid conducting members for movement of said actuating member to move its associated valve means to open position, said valve means of said second fluid conducting member thereafter being fluid pressure actuated to its open position.

8. A valved coupling comprising a first fluid conducting member having a fluid conductor connected thereto, said first fluid conducting member having a fluid passage, a movable valve means in said fluid passage controlling flow of fluid therethrough, a second fluid conducting member having a fluid passage, a movable valve means therein for controlling the passage of fluid therethrough, spring means acting upon each of said valve means normally for biasing each to its closed position, said first and second fluid conducting members each having fluid ports adapted to be placed in aligning communication to connect the fluid passages thereof, guide means on said first fluid conducting member, said second fluid conducting member having a slotted area for receiving said guide means, said slotted area including wall portions slidably engageable by surfaces of said guide means for effecting rectilinear and rotative movement of said guide means within said slotted area into holding engagement with the slotted area for releasably connecting said fluid conducting members one to the other, said guide means having an opening in alignment with the fluid port of said first fluid conducting member, rectilinearly movable retainer means having a fluid passage therethrough slidably positioned in said latter fluid port and carrying an annular sealing means adapted to be placed in sealing relationship about the fluid port of said second fluid conducting member on the connection of the said fluid conducting members one to the other, said slotted area having a plurality of surfaces spaced in elevation from one another, projecting means on said retainer means rideable on said surfaces effecting progressive movement of said annular sealing means to its sealing position about said fluid port of said second fluid conducting member, actuator means on said first fluid conducting member operative upon the valve means thereof, and camming surfaces on said second fluid conducting member engageable by said actuator means on connection of said fluid conducting members for movement of said actuator means to move its valve means progressively to open position for passage of fluid from the fluid passage of said first fluid conducting member through said fluid ports to the fluid passage of said second fluid conducting member for pressure actuation of the valve means therein to open position.

9. A valved coupling comprising a first coupling member, a second coupling member adapted to be readily releasably connected to said first coupling member, each of said coupling members having a fluid passage therein, normally closed valve members positioned in each of said fluid passages to regulate the flow therethrough, said coupling members each having a fluid port leading from the fluid passages thereof, said fluid ports adapted to be aligned, on connection of said couplings to one another, to provide communication between said fluid passages of said coupling members, movable means having a fluid passage therethrough positioned in said fluid port of said first coupling member, an annular sealing means carried by said movable means adapted to be placed in sealing relationship about the fluid port of said second fluid conducting member on the connection of the said fluid conducting members one to the other, an actuating member operative upon said valve member of said first coupling member, and means on said second coupling member for moving said actuating member on connection of said coupling members one to the other to move its valve member to open position, said valve member of said second coupling member thereafter being fluid pressure actuated to its open position.

10. A valved coupling comprising a first coupling member, a second coupling member adapted to be readily releasably connected to said first coupling member, each of said coupling members having a fluid passage therein, normally closed valve members positioned in each of said fluid passages to regulate the flow therethrough, said coupling members each having a fluid port leading from the fluid passages thereof, said fluid ports adapted to be aligned, on connection of said couplings to one another, to provide communication between said fluid passages of said coupling members, rectilinearly movable means having a fluid passage therethrough positioned in said fluid port of said first coupling member, an annular sealing means carried by said movable means adapted to be placed in sealing relationship about the fluid port of said second fluid conducting member on the connection of the said fluid conducting members one to the other, guide surfaces on said second fluid conducting member engageable by said rectilinearly movable member for effecting progressive movement of said annular sealing means to its sealed position about the fluid port of said second fluid conducting member, an actuating member operative upon said valve member of said first coupling member, and means on said second coupling member for moving said actuating member on connection of said coupling members one to the other to move its valve member to open position, said valve member of said second coupling member thereafter being fluid pressure actuated to its open position.

11. A valved coupling comprising a first coupling member, a second coupling member adapted to be readily releasably connected to said first coupling member, each of said coupling members having a fluid passage therein, valve members positioned in each of said fluid passages to regulate the flow therethrough, spring means acting upon each of said valve members normally biasing each to its closed position, said coupling members each having a fluid port leading from the fluid passages thereof, said fluid ports adapted to be aligned, on connection of said couplings to one another, to provide communication between said fluid passages of said coupling members, movable means having a fluid passage therethrough positioned in said fluid port of said first coupling member, an annular sealing means carried by said movable means adapted to be placed in sealing relationship about the fluid port of said second fluid conducting member on the connection of the said fluid conducting members one to the other, actuator means on said first coupling member operative upon the valve means thereof, and a camming portion on said second coupling member engageable by said actuator means on connection of said coupling members to each other for movement of said actuator means to progressively move its valve means to open position for passage of fluid from the fluid passage of said first coupling member through said aligned fluid ports to the fluid passage of said second coupling member for pressure actuation of the valve member therein to open position.

12. A valved coupling comprising a first fluid conducting member having a fluid conductor connected thereto, a second fluid conducting member, normally closed movable valve means in fluid passages of each of said fluid conducting members controlling the passage of fluid therethrough, said first and second fluid conducting members each having fluid ports leading from the fluid passages thereof and adapted to be placed in communication with each other, guide means on said first fluid conducting member, said second fluid conducting member having a slot therein, said slot including wall portions slidably engageable by surfaces of said guide means for effecting rectilinear and rotative movement of said guide means within said slot into holding engagement with the slot for releasably connecting said fluid conducting members one to the other, sealing cover means movably carried by each of said fluid conducting members normally to close the fluid ports thereof, surface portions on each of said fluid conducting members engageable, on connection of said fluid conducting members, with the sealing cover means of the other fluid conducting member for movement thereof to open said fluid ports for communication therebetween, said sealing cover means on said first fluid conducting member having a vent passage therein open to atmosphere and in communication with the fluid passage of the first fluid conducting member for venting leaked fluid therefrom, an actuating member operative upon said valve means of said first coupling member, and means on said second coupling member for moving said actuating member on connection of said coupling members one to the other to move its valve means to open position, said valve means of said second coupling member thereafter being fluid pressure actuated to its open position.

References Cited in the file of this patent
UNITED STATES PATENTS

| | | |
|---|---|---|
| 615,623 | King | Dec. 6, 1898 |
| 2,393,489 | Frantman | Jan. 22, 1946 |
| 2,800,343 | Ulrich | July 23, 1957 |